United States Patent
Lentz et al.

(10) Patent No.: US 9,952,914 B2
(45) Date of Patent: *Apr. 24, 2018

(54) INTEGRATED PARAMETER CONTROL WITH PERSISTENCE INDICATION

(71) Applicant: International Business Machines Corporation, Armonk, NY (US)

(72) Inventors: James L. Lentz, Austin, TX (US); David R. Schwartz, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 14/924,880

(22) Filed: Oct. 28, 2015

(65) Prior Publication Data

US 2016/0283255 A1    Sep. 29, 2016

Related U.S. Application Data

(63) Continuation of application No. 14/667,991, filed on Mar. 25, 2015, now Pat. No. 9,594,604.

(51) Int. Cl.
G06F 9/54    (2006.01)
G06F 9/445    (2018.01)

(52) U.S. Cl.
CPC ............ *G06F 9/54* (2013.01); *G06F 9/44505* (2013.01)

(58) Field of Classification Search
CPC ....................................................... G06F 9/54
See application file for complete search history.

(56) References Cited

U.S. PATENT DOCUMENTS

| 8,225,227 | B2 | 7/2012 | Headrick et al. | |
| 2002/0023211 | A1* | 2/2002 | Roth | G06F 9/44505 713/164 |
| 2004/0008362 | A1 | 1/2004 | Sesek | |
| 2008/0126959 | A1 | 5/2008 | Naick et al. | |
| 2009/0064001 | A1 | 3/2009 | Robbins | |
| 2011/0283138 | A1* | 11/2011 | Sangubhatla | H04L 41/0813 714/15 |
| 2012/0324396 | A1 | 12/2012 | Baartman et al. | |
| 2013/0177149 | A1 | 7/2013 | Thomson et al. | |

OTHER PUBLICATIONS

Appendix P "IBM Patent and Patent Applications Treated as Related" dated Oct. 28, 2015, pp. 2.
"Temporary Versus Permanent Changes". Surf's Up—Surfing the Internet with JAWS and MAGic; Freedom Scientific. <http://www.freedomscientific.com/training/Surfs-Up/Temporary_Versus_Permanent.htm>.
U.S. Appl. No. 14/667,991, filed Mar. 25, 2015 entitled "Integrated Parameter Control With Persistence Indication".

* cited by examiner

*Primary Examiner* — Brian W Wathen
*Assistant Examiner* — Abdou Seye
(74) *Attorney, Agent, or Firm* — Edward J. Wixted, III (57) ABSTRACT

Aspects of the present invention disclose a method for customizing a parameter value in a software program. The method includes one or more processors receiving one integrated input requesting a change to the original value of a parameter in a software program to a new value of the parameter and defining a persistence level of the new value of the parameter. The method further includes one or more processors changing the original value of the parameter to the new value of the parameter based on the one integrated input and setting the persistence level of the new value based on the one integrated input.

3 Claims, 8 Drawing Sheets

CLICKING DATE DISPLAYS
SORT OPTIONS SHOWN BELOW

DRAG CURSOR TO THE RIGHT TO SET
NEW PERSISTENT SORT PARAMETER

PERSISTENT PERSISTENCE LEVEL INDICATED
BY A BREAK BETWEEN THE 2 FIELDS

IN THIS INSTANCE, NO EXPIRATION
CONDITION IS SET SINCE THE
PARAMETER CHANGE IS PERSISTENT

ORIGINAL CARD CHOICE IS CARD D

TRANSIENT CHANGE MADE TO SWITCH CARD CHOICE TO CARD B. DONE BY CLICKING APPROPRIATE BUTTON AND DRAGGING IT TO THE RIGHT. TRANSIENCY IS INDICATED BY THE CONNECTOR GRAPHIC.

AFTER THE EXPIRATION CONDITION IS MET, THE CARD CHOICE RETURNS TO THE ORIGINAL CARD CHOICE

INTEGRATED PARAMETER CONTROL WITH PERSISTENCE INDICATION

BACKGROUND OF THE INVENTION

The present invention relates generally to the field of application software, and more particularly to how parameter values are changed and persistence levels are controlled.

Software applications have pre-defined values for parameters to be used when the application is running. It is sometimes necessary to change a parameter value to something other than the original value. This change can be persistent, resulting in a new value for that particular parameter, or the change can be transient, with the value reverting back to the original value after time passes, a task is completed or some other event occurs. Making these changes may involve pop-up dialog boxes or other intrusive interactions, which interrupt workflow for the user. Also, unintended errors may occur if a user is not aware whether a change is persistent or transient or if the user forgets to change a transient value back to the original value.

SUMMARY

Aspects of the present invention disclose a method for customizing a parameter value in a software program. The method includes one or more processors receiving one integrated input requesting a change to the original value of a parameter in a software program to a new value of the parameter and defining a persistence level of the new value of the parameter. The method further includes one or more processors changing the original value of the parameter to the new value of the parameter based on the one integrated input and setting the persistence level of the new value based on the one integrated input.

DETAILED DESCRIPTION

Embodiments of the present invention recognize that software applications have pre-defined parameter values. It is often necessary to change these parameters; depending upon need, that change can be transient or persistent.

Embodiments of the present invention recognize that use of application software often involves changing parameter values for customization and user preference. Making those changes may involve pop-up dialog boxes and multiple inputs to specify the required user preferences. Responding to the dialog boxes may be disruptive to workflow. How long a parameter value change is in effect may be time based (it will revert to the original value when the time elapses), may be based on the application (it will revert to the original value when the application is closed or some other event occurs) or the change may be persistent. Knowing with certainty if the changed value is transient or persistent may help to prevent the occurrence of an unwanted outcome when the application is used in the future. For example, assume that e-mail is sorted by date. The sort parameter of date can be changed permanently to sender so e-mail is presented alphabetically by the sender's last name rather than chronologically. This results in an e-mail from Mary Aaron showing on top of the e-mail list. Upon opening the e-mail application the following day, it may appear that no new e-mail arrived because the Aaron e-mail is still on top. However, a new e-mail from Joe Zappa may have been received overnight but it may be missed as it is off-screen at the bottom of the e-mail list. Embodiments of the present invention provide for integrated actions and visual indicator of persistence when changing a parameter value.

Figure 1:
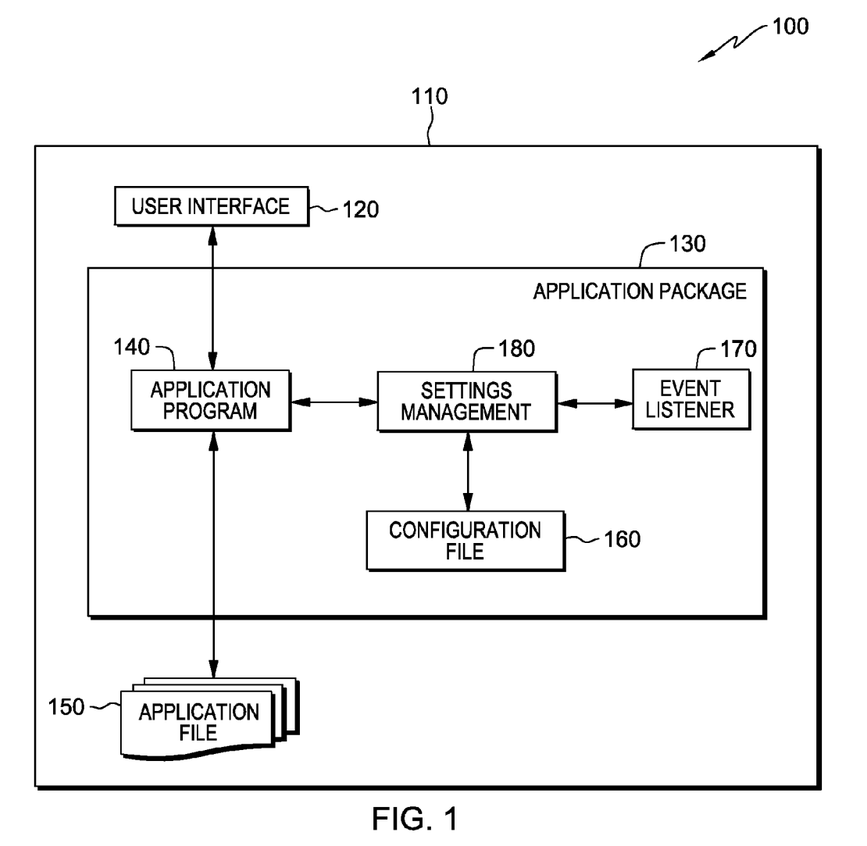
FIG. 1 is a functional block diagram of a computer environment depicting a user interface controlling an application, in accordance with an embodiment of the present invention.

The present invention will now be described in detail with references to the Figures. FIG. 1 is a functional block diagram of a computer environment, generally designated 100, in accordance with an embodiment of the present invention.

An embodiment of computer environment 100 includes computer 110, user interface 120, application package 130, application program 140, application file 150, configuration file 160, event listener 170, and settings management 180. Computer environment 100 can include other computing devices not shown such as processors, hard drives, read only memory, random access memory, displays, tablet computers, laptop computers, desktop computers, computer servers, or any other computer systems known in the art.

In various embodiments of the present invention, computer 110 can be a workstation, personal computer, netbook computer, tablet computer, personal digital assistant (PDA), mobile phone, or any other device capable of executing computer readable program instructions. In general, computer 110 is representative of any electronic device or combination of electronic devices capable of executing computer readable program instructions. Computer 110 can include components as depicted and described in further detail with respect to FIG. 5, in accordance with embodiments of the present invention. This representation of computer 110 provides only an illustrative embodiment of one implementation and does not imply any limitations with regard to computer 110.

In example embodiments, computer 110 can be connected to a network which enables computer 110 to access other computing devices and/or data not directly stored to computer 110. The network can be a local area network (LAN), a telecommunications network, a wide area network (WAN) such as the Internet, or any combination of the three, and include wired, wireless or fiber optic connections. In general, the network can be any combination of connections and protocols that will support communications between computer 110 and other computing devices, in accordance with embodiments of the present invention.

In various embodiments of the present invention, user interface 120 can be a program that controls input to application package 130 via a plurality of devices such as a keyboard, a mouse, a touch screen, a stylus, a microphone, etc. In general, the user interface is the space where interactions between humans and machines occur. With the prevalence of the personal computer, the term user interface many times means the graphical user interface. A graphical user interface (or GUI) is a type of interface that allows interaction between humans and electronic devices through graphical icons and visual indicators. Actions in a GUI are performed through direct manipulation of graphical elements displayed in the GUI. In example embodiments, user interface 120 displays information from application package 130 allowing for manipulation of elements within application package 130.

In one embodiment, application package 130 includes application program 140, configuration file 160, event listener 170, and settings management 180. Application package 130 is a program designed to carry out operations to complete a specific task. In various embodiments, application package 130 is a word processor, a spreadsheet system, a database, a smartphone game, an e-mail system, a calendar system, etc. Application package 130 cannot run on itself but is dependent on system software to execute. The system software serves the application, which in turn serves the user. Application package 130 may be either bundled with computer 110 and its system software or published separately.

Application program 140 is the sequence of instructions written by a programmer to perform the specific task of application package 130, in accordance with various embodiments of the present invention. Application program 140 may be the code that controls the function of an e-mail program or it may be the software that allows a video game to be played simultaneously by multiple users over the internet. Application package 130 cannot function properly without application program 140.

In various embodiments of the present invention, application file 150 are files created or used by application program 140. These files store data specific to an item (document, file, database, calendar, etc.) created as a result of interaction with application program 140. In example embodiments, application file 150 may be a text document, a spreadsheet, a calendar, etc.

In one embodiment, configuration file 160 stores the various pre-defined parameter values (i.e., a configuration) used by application program 140. When application program 140 is executed, it reads configuration file 160 to see what parameter values are in effect. In various embodiments of the present invention, application program 140 reads configuration file 160 at startup, periodically while in use, or when instructed by a user of application package 130. Whenever configuration file 160 is read, the parameter values contained within are applied to the current process.

In one embodiment, event listener 170 is the component of application package 130 that monitors for the occurrence of a pre-defined event or an expiration condition. In computing, an event may be a keystroke, a mouse click, input received from another program or application, etc. An expiration condition may be elapsed time, the closing of a program or application, rebooting the computer, shutting down the computer, etc. According to various embodiments of the present invention, event listener 170 sends an indication when a particular event occurs or when a particular expiration condition has been met.

In one embodiment, settings management 180 is the component of application package 130 that manages changes to the parameter values used by application program 140. Settings management 180 also interacts with event listener 170 as it monitors for event occurrence or an expiration condition being met. In an example embodiment, a parameter's original value of 'A' is temporarily changed to a new parameter value of 'B'; this new selection will remain in effect for 1 hour so the persistence level is transient. Settings management 180 will change the parameter value from 'A' to 'B' and store 'B' in configuration file 160, along with the 1 hour expiration condition. Application program 140 will begin executing using new parameter value 'B'. Event listener 170 will monitor elapsed time and upon 1 hour passing, will send a notification that parameter value 'B' will revert to its original value of 'A' unless a user of application package 130 defines another expiration condition.

Figure 2A:
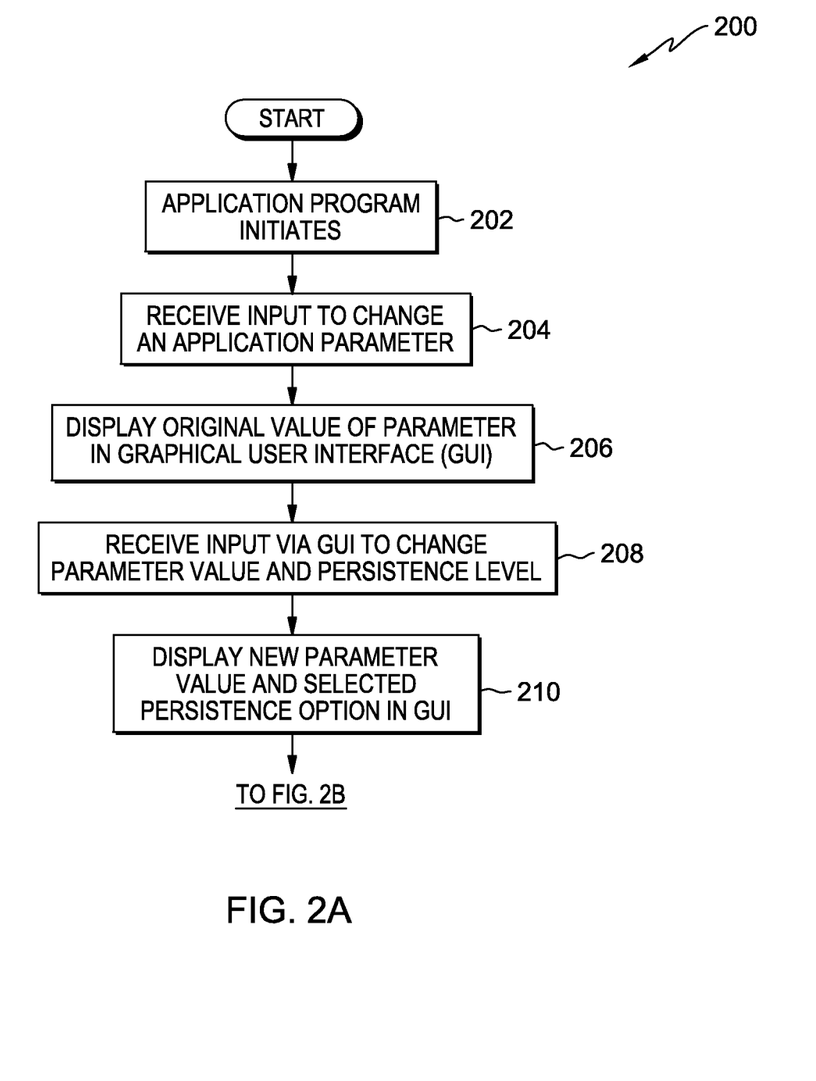
FIG. 2A through FIG. 2B depict a flowchart illustrating the steps involved in changing parameter values and selecting a persistence level for that particular parameter, in accordance with an embodiment of the present invention.
Figure 2B:
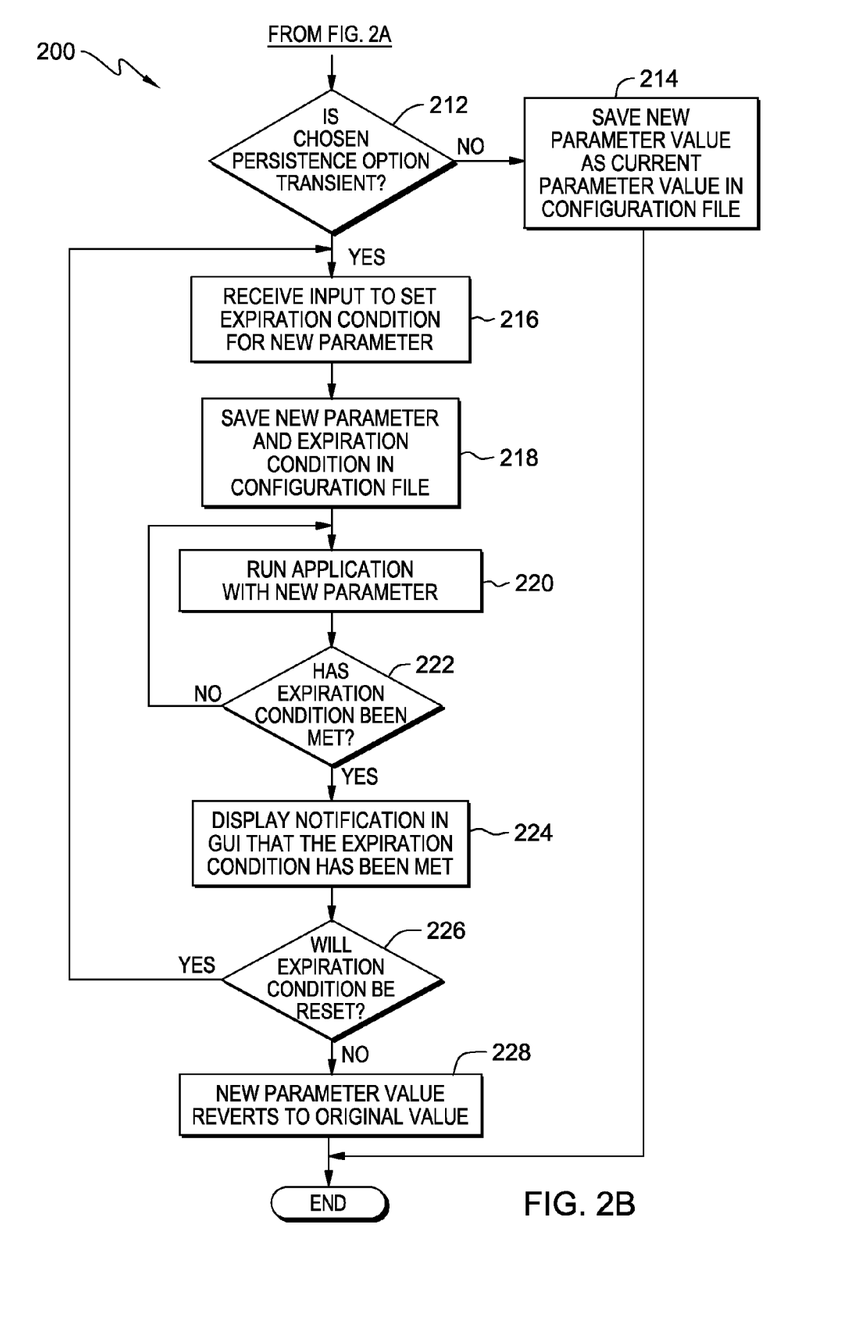

FIGS. 2A and 2B are flowcharts depicting operational steps 200 for changing parameter values and simultaneously selecting a persistence level for that particular parameter.

In step 202, application program 140 initiates. In one embodiment, input is received from user interface 120 to open application program 140. Example applications include an e-mail program or an application for selecting a credit card, from a list of credit cards, during an internet purchase. See FIGS. 3A and 3B and FIGS. 4A and 4B, for exemplary user interface interactions.

In step 204, application program 140 receives input to change an application parameter. In one embodiment, application program 140 receives input from a user of application package 130 via user interface 120. The parameter may be the sort parameter in an e-mail program or the credit card choice during an internet purchase session, in accordance with various embodiments of the present invention.

Figure 3A:
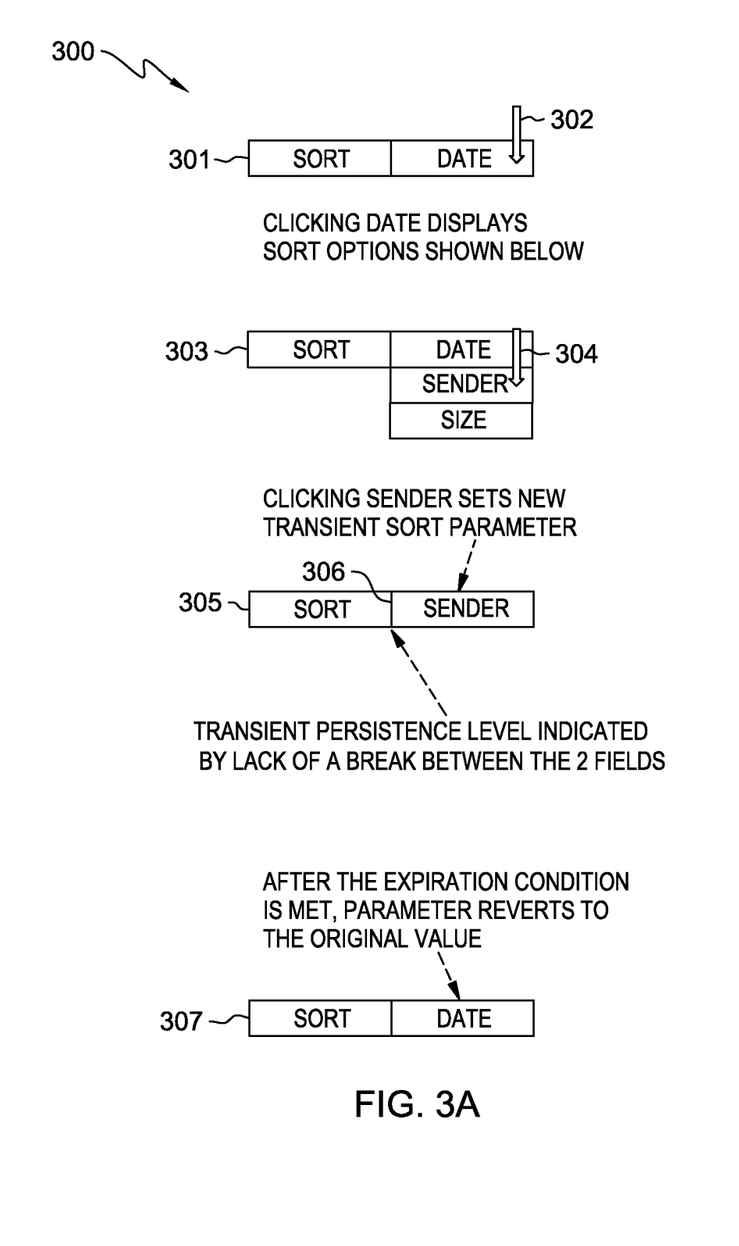
FIG. 3A is an example depiction of a transient parameter change in an e-mail program, in accordance with an embodiment of the present invention.
Figure 4A:
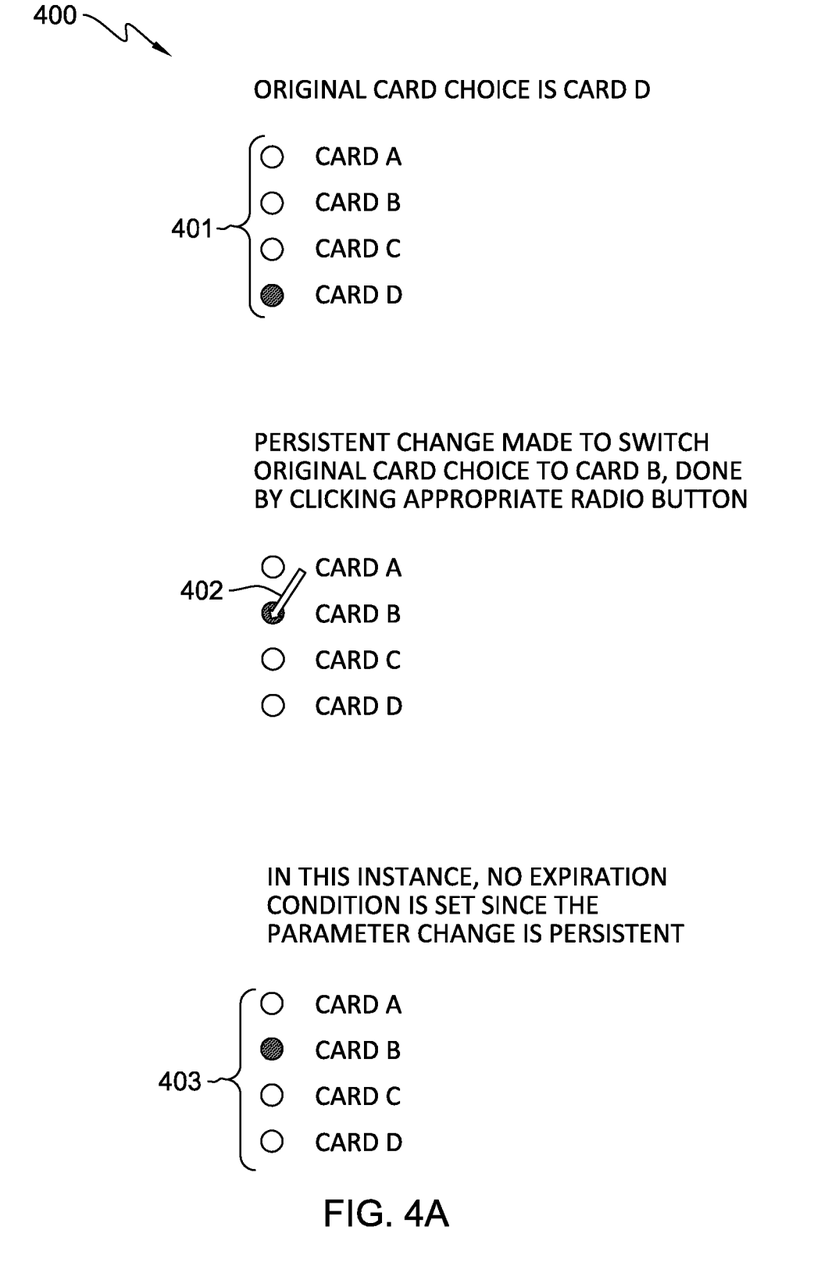
FIG. 4A is an example depiction of a persistent parameter change in an internet buying session, in accordance with an embodiment of the present invention.

In step 206, application program 140 displays the original value of the parameter to be changed in the GUI. In one embodiment, the GUI receives data from application program 140 to display the original value. In FIG. 3A example sequence 300, view 301, an e-mail program sorts individual e-mails by date, in chronological order. In this example, 'date' is the parameter that is changing. In FIG. 4A example sequence 400, consider a purchase made on-line using a credit card. In this example, the 'choice of card' is the parameter that is changing.

Figure 3B:
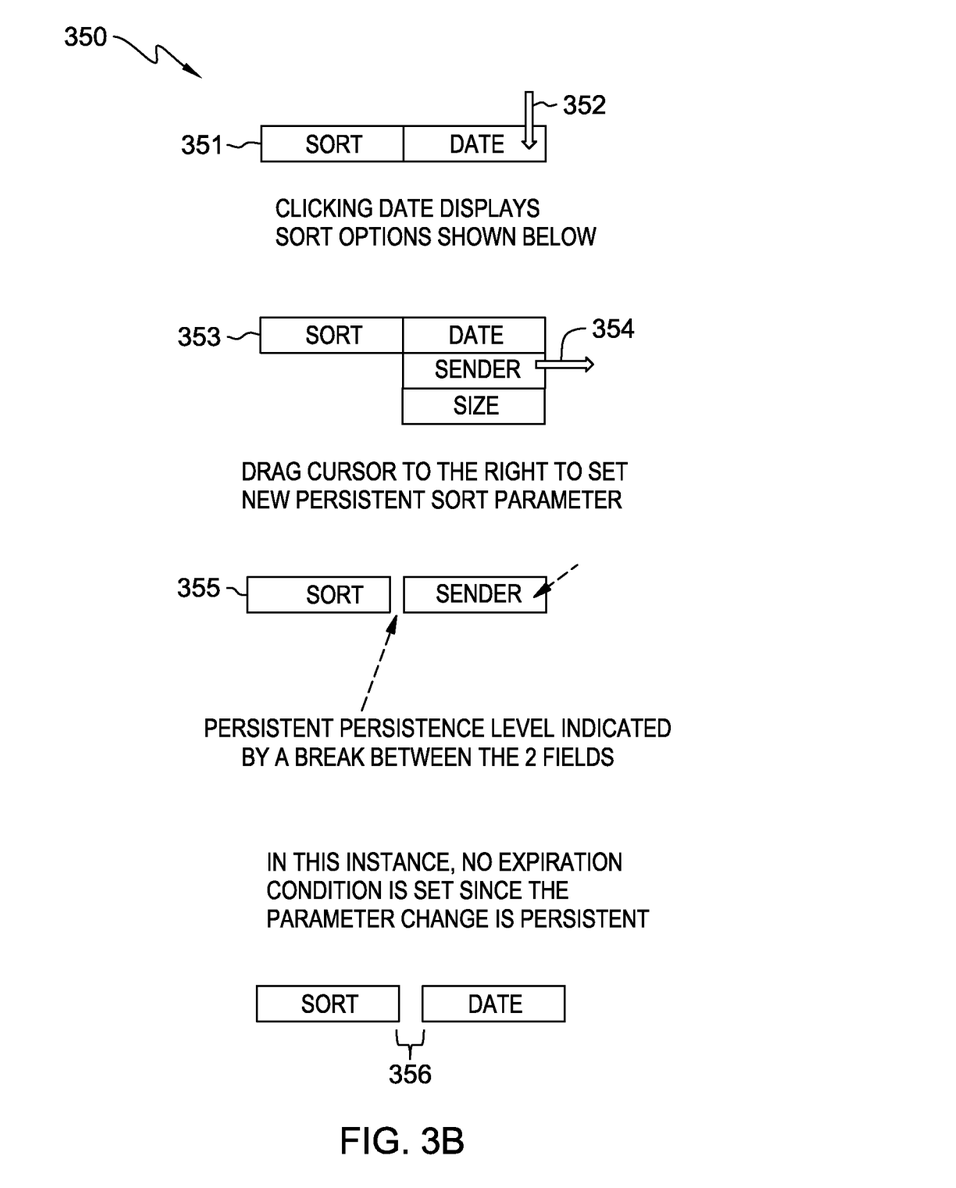
FIG. 3B is an example depiction of a persistent parameter change in an e-mail program, in accordance with an embodiment of the present invention.

In step 208, application program 140 receives one integrated input via the GUI to change the original value of the parameter to a new value and to set the persistence level of the new parameter. The one integrated input is a combined action to set both the new parameter value and the persistence level of that value where the combined action is defined by the developer of the software, in this case, application package 130. In one embodiment, a user of application package 130 sends input to application program 140 through user interface 120. In the e-mail program example of sequence 300, the sort parameter 'date' is changed to 'sender' by executing interactions 302 and 304. First, interaction 302 is a click of the 'date' field to open a drop down menu displaying additional sort options (view 303). This is followed by interaction 304, which is clicking the 'sender' field to select 'sender' as the new sort parameter. This action sets 'sender' as the transient sort parameter (view 305) with the persistence level indicated by the lack of separation between the two fields (view 306). Follow example sequence 350 to set 'sender' as the persistent, rather than transient, sort parameter. First, a click on the 'sender' field (interaction 352) is executed followed immediately by a cursor drag to the right (interaction 354) before releasing the mouse button. This combination of interactions results in 'sender' being the persistent sort parameter for the e-mail program with the persistence level indicated by the break between the two fields (view 355 and view 356).

Figure 4B:
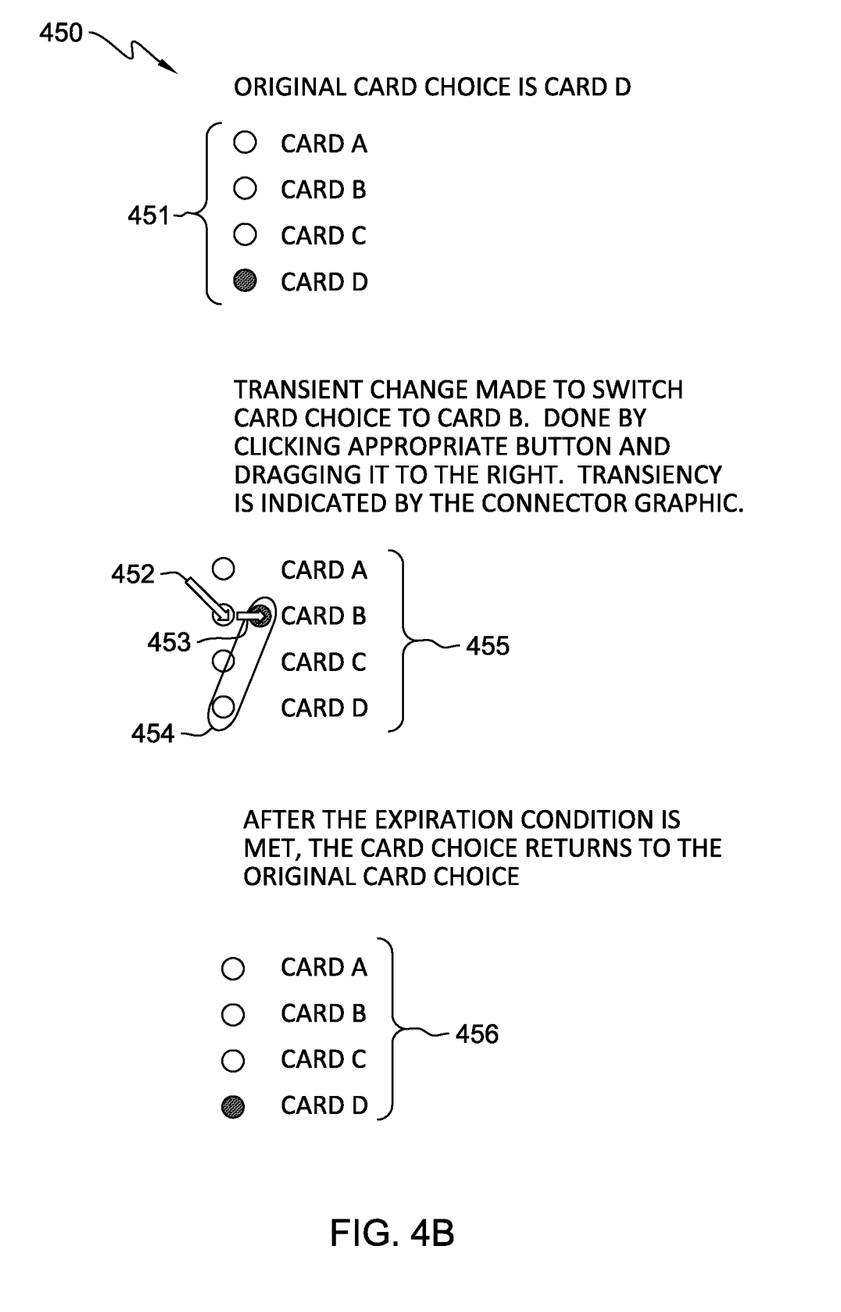
FIG. 4B is an example depiction of a transient parameter change in an internet buying session, in accordance with an embodiment of the present invention.

In another example, FIG. 4A, example sequence 400, view 401 and FIG. 4B, example sequence 450, view 451, the 'choice of card' value is being changed from the original card to a new selection. The action required for this change is a simple click of the radio button, interaction 402 in example sequence 400, corresponding to the new selection, e.g., CARD B. This sets CARD B as the new 'choice of card' parameter with a persistence level of persistent (view 403). Following example sequence 450, to make this parameter change transient, click the appropriate radio button (interaction 452) followed immediately by a cursor drag to the right (interaction 453) before releasing the mouse button. The combination of interactions results in CARD B as the transient 'choice of card' with the persistence level indicated by the connector graphic (view 454).

In step 210, application program 140 displays the new parameter value and selected persistence option, in the GUI, for the particular parameter value. In one embodiment, application package 130 displays the new parameter value and selected persistence level in the GUI. In one example, FIG. 3A, example sequence 300, view 305, the new sort parameter 'sender' is displayed as the current value. The visual indication of the transient persistence level, view 306, is the lack of separation between the terms 'sort' and 'sender'. In another example, FIG. 3B, example sequence 350, view 355, the new sort parameter 'sender' is again displayed as the current value. The visual indication (view 356) of the persistence level, in this example, is the separation between the terms 'sort' and 'sender'; that level is persistent.

In another example, FIG. 4A, example sequence 400, view 403, the highlighted radio button indicates the new card choice. The visual indication that the persistence level is persistent is the lack of any connector graphic. In another example, FIG. 4B, example sequence 450, view 455, the highlighted radio button indicates the new card choice again. However, in this example, there is a connector graphic between the new card choice and the original card choice (view 454); this graphic is the visual indicator of a transient persistence level.

In decision step 212, application program 140 determines whether the chosen persistence option is transient. In one embodiment, application program 140 determines whether the persistence level is transient based on receiving input from step 208. Application program 140 now determines if an expiration condition is required based on the persistence level. In one example, if the persistence level is not transient (decision step 212, NO branch), the application program proceeds to step 214 and stores the updated parameter value in the configuration file. In another example, if the persistence level is transient (decision step 212, YES branch), the application program proceeds to step 216 to receive input to set the expiration condition for the new parameter.

In step 214, after determining that persistent was the selected persistence option in step 208, application program 140 saves the new parameter value as the current parameter value in configuration file 160. In one embodiment, application program 140 sends the updated data to settings management 180 which in turn stores the data to configuration file 160. The result of this step is that the application program uses the new parameter until such time that the parameter is intentionally changed. FIG. 3B, example sequence 350, view 356, and FIG. 4A, example sequence 400, view 403 illustrate two examples.

In step 216, after determining that transient was the selected persistence option in step 208, application program 140 receives input to set the expiration condition for the new parameter. In an example embodiment, a user of application package 130 inputs the expiration condition through user interface 120. In various embodiments, the expiration condition may be elapsed time (e.g., 1 hour, 24 hours, 1 week, etc.), may last for the duration of the user session (i.e., when the application program is closed), may remain in effect until the computer is restarted or rebooted, or may be any other condition or event.

In step 218, application program 140 stores the new parameter value as well as the expiration condition in configuration file 160. In an example embodiment, settings management 180 stores the updated information to configuration file 160. In one example, an e-mail program uses the sort parameter 'sender' until it shuts down (an event condition). In another example, CARD B is the credit card used for internet purchases for the next hour (an elapsed time condition). Each application, such as application package 130, will define the unique interactions necessary for determining the transient period.

In step 220, application program 140 runs with the new parameter value. In an example embodiment, a user of computer 110 inputs instruction to application package 130 via user interface 120. In one example, e-mail is sorted based on 'sender', as depicted in FIGS. 3A and 3B, while in another example, internet purchases are made using CARD B, as depicted in FIGS. 4A and 4B.

In decision step 222, application program 140 has received input setting an expiration condition for the transient parameter value (step 216) and now it determines whether the expiration condition passed. In various embodiments, event listener 170 has detected that the e-mail program has been closed or that 1 hour of elapsed time has passed for the internet buying session and it sends an indication to application program 140. In one embodiment, if the expiration condition is met (step 222, YES branch), then the application program proceeds to step 224 and displays a notification in the GUI. In another embodiment, application program 140 proceeds directly to step 226. In another embodiment, if the expiration condition is not met (step 222, NO branch), then the application program continues to run using the transient parameter value. Event listener 170 will continue to periodically check whether the expiration condition has been met.

In various embodiments, there is not an expiration condition to meet since persistent was the selected persistence level. In other embodiments, the expiration condition passed. For example, the e-mail program closed down or the hour elapsed for the internet buying session. Without intervention by the user of the application program, the transient parameters will revert back to their original values.

In step 224, application program 140 displays an indication in the GUI that the expiration condition has been met, as determined in decision step 222. In one embodiment, event listener 170 has detected the e-mail program has been closed or that 1 hour of time has passed and it sends an indication to application program 140. In various embodiments of the present invention, this indication may be in the form of a visual indicator, a sound from the computer, a pop-up dialog box, etc. Based on this indication, application program 140 will proceed with one of two options.

In decision step 226, application program 140 has received input that the expiration condition has been met and now the updated parameter either receives a new expiration condition or it reverts back to its original value. In one embodiment, if the expiration condition will be reset (decision step 226, YES branch), allowing the application program to continue to use the transient parameter value, then the application program proceeds to step 216 to receive input to set a new expiration condition. In another embodiment, if the expiration condition will not be reset (decision step 226, NO branch), then the application program will proceed to step 228 where the transient parameter value will revert to its original value.

In step 228, because the expiration condition has lapsed, application program 140 changes the parameter value from the transient parameter value back to the original value contained in configuration file 160. In one embodiment, settings management 180 queries configuration file 160 for the original parameter value to be used by application program 140. In the example of FIG. 3A, example sequence 300, view 307, the e-mail program closed down and the sort parameter 'sender' reverts to 'date'. In another example, FIG. 4B, example sequence 450, view 456, an hour elapsed for the internet buying session and the selected credit card, CARD B, reverts back to the original card choice, CARD D. Application program 140 functions with the original parameter values until another parameter change is made.

FIG. 3A illustrates exemplary user interface interactions for changing the sort parameter in an e-mail program to a new, transient value, generally designated as example sequence 300. View 301 shows that the current sort parameter for the e-mail program is 'date'. When interaction 302, clicking the parameter 'date', is executed, the sort parameter options are displayed as in view 303. Executing interaction 304, clicking the parameter 'sender', changes the sort parameter from 'date' to 'sender' as in view 305. The transient persistence level is illustrated by the lack of separation between the sort field and the parameter field as in view 306. After the defined expiration condition is met, the parameter value reverts to the original value as in view 307. The visual indicators and associated user interface gestures are provided for illustrative purposes only. Any number of visual indicators and gestures may be used, in accordance with various embodiments of the present invention.

FIG. 3B illustrates exemplary user interface interactions for changing the sort parameter in an e-mail program to a new, persistent value, generally designated as example sequence 350. View 351 shows that the current sort parameter for the e-mail program is 'date'. When interaction 352, clicking the parameter 'date', is executed, the sort parameter options are displayed as in view 353. Before interaction 352 is completed, interaction 354 is also executed; this involves a dragging motion to the right. Executing the combination of interaction 352 and interaction 354 changes the sort parameter from 'date' to 'sender' as in view 355. The persistence level of persistent is illustrated by the presence of a separation between the sort field and the parameter field as in view 356. The sort value will not revert to the previous value until it is intentionally changed. The visual indicators and associated user interface gestures are provided for illustrative purposes only. Any number of visual indicators and gestures may be used, in accordance with various embodiments of the present invention.

FIG. 4A illustrates exemplary user interface interactions for changing the choice of card during an internet buying session to a new, persistent value, generally designated as example sequence 400. View 401 shows that the current card choice is CARD D. When interaction 402, clicking the radio button associated with CARD B, is executed, the card choice changes from D to B, view 403. Since no connector graphic is displayed, the change is persistent and remains as shown in view 403 until it is intentionally changed. The visual indicators and associated user interface gestures are provided for illustrative purposes only. Any number of visual indicators and gestures may be used, in accordance with various embodiments of the present invention.

FIG. 4B illustrates exemplary user interface interactions for changing the choice of card during an internet buying session to a new, transient value, generally designated as example sequence 450. View 451 shows that the current card choice is CARD D. When interaction 452, clicking the radio button associated with CARD B, is executed, the card choice changes from D to B, view 455. Before interaction 452 is complete, interaction 453 is also executed; this involves a dragging motion to the right. Executing the combination of interaction 452 and interaction 453 changes the card choice from D to B as in view 455. The transient persistence level is indicated by the connector graphic, view 454. After the defined expiration condition is met, the card choice reverts to the original value as in view 456. The visual indicators and associated user interface gestures are provided for illustrative purposes only. Any number of visual indicators and gestures may be used, in accordance with various embodiments of the present invention.

Figure 5:
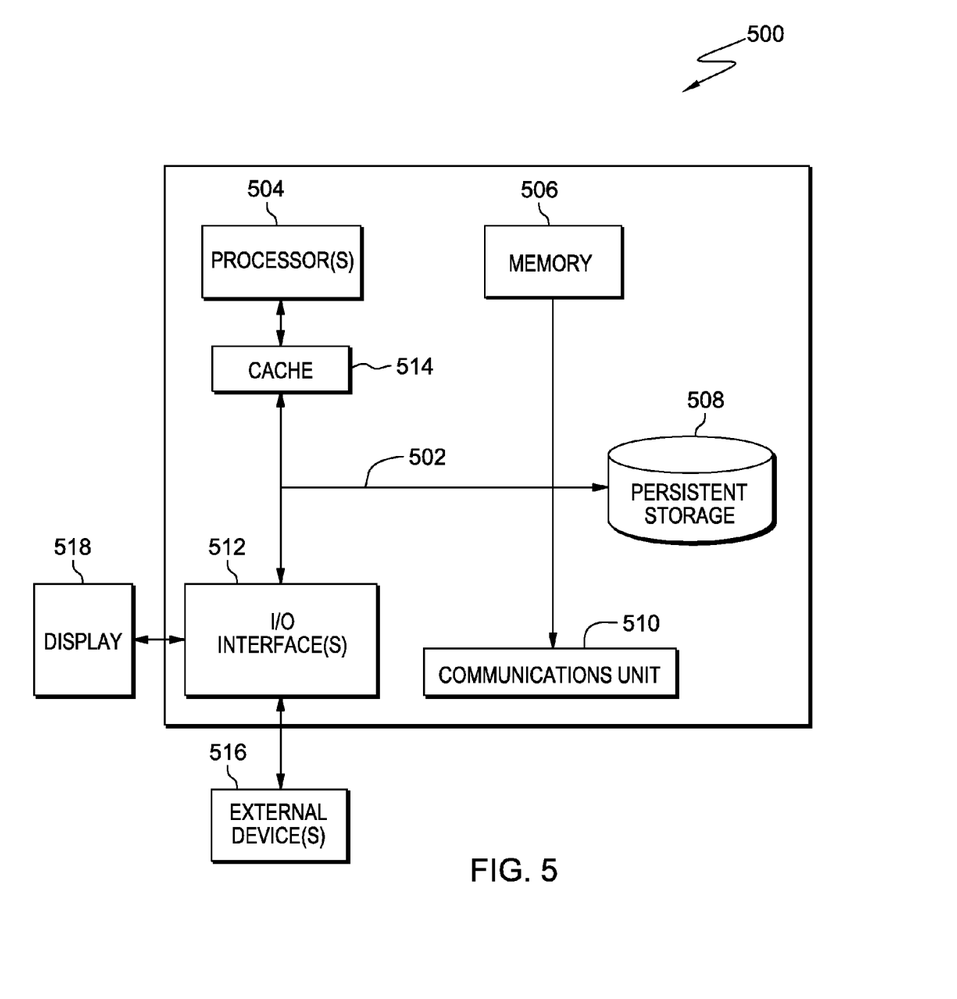
FIG. 5 depicts a block diagram of the components of a computing system representative of the computer of FIG. 1, in accordance with an embodiment of the present invention.

FIG. 5 depicts a block diagram of components of computer 500, which is representative of computer 110, in accordance with an illustrative embodiment of the present invention. It should be appreciated that FIG. 5 provides only an illustration of one implementation and does not imply any limitations with regard to the environments in which different embodiments can be implemented. Many modifications to the depicted environment can be made.

Computer 500 includes processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506. With respect to computer 110, persistent storage 508 includes application package 130 and application file 150.

In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of computer 110. In these examples, communications unit 510 includes one or more network interface cards. Communications unit 510 may provide communications through the use of either or both physical and wireless communications links. In various embodiments, application package 130 can be downloaded to persistent storage 508 through communications unit 510.

I/O interface(s) 512 allows for input and output of data with other devices that may be connected to computer 110. For example, I/O interface(s) 512 may provide a connection to external device(s) 516 such as a keyboard, a keypad, a touch screen, and/or some other suitable input device. External device(s) 516 can also include portable computer readable storage media such as, for example, thumb drives, portable optical or magnetic disks, and memory cards. Software and data used to practice embodiments of the present invention, (e.g., application package 130), can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for customizing a parameter value in a software program, the computer program product comprising:
one or more non-transitory computer readable storage media, program instructions stored on the one or more computer readable storage media, the program instructions comprising:
program instructions to receive one integrated input to change an original value of a parameter in a software program to a new value of the parameter, wherein: the one integrated input also defines a persistence level of the new value of the parameter; and the persistence level in transient;
program instructions to change the original value of the parameter to the new value of the parameter based on the one integrated input, and to set the persistence level of the new value based on the one integrated input;
program instructions to receive an input defining an expiration condition of the persistence level that is transient;
program instructions to receive an indication that the expiration condition has been met;
program instructions to determine whether the expiration condition will be reset; and
program instructions to change, in response to determining that the expiration condition will not be reset, the new value of the parameter to the original value of the parameter.

2. The computer program product of claim 1, wherein the one integrated input is a combined action to set both the new value of the parameter and the persistence level of the new value of the parameter, wherein the combined action is defined by a software program developer.

3. A computer system for customizing a parameter value in a software program, the computer system comprising:
one or more computer processors;
one or more computer readable storage media; and
program instructions stored on the computer readable storage media for execution by at least one of the one or more processors, the program instructions comprising:
program instructions to receive one integrated input to change an original value of a parameter in a software program to a new value of the parameter, wherein: the one integrated input also defines a persistence level of the new value of the parameter; and the persistence level in transient;
program instructions to change the original value of the parameter to the new value of the parameter based on the one integrated input, and to set the persistence level of the new value based on the one integrated input;
program instructions to receive an input defining an expiration condition of the persistence level that is transient;
program instructions to receive an indication that the expiration condition has been met;
program instructions to determine whether the expiration condition will be reset; and
program instructions to change, in response to determining that the expiration condition will not be reset, the new value of the parameter to the original value of the parameter.

* * * * *